US008402172B2

(12) United States Patent  
Muppirala et al.

(10) Patent No.: US 8,402,172 B2
(45) Date of Patent: Mar. 19, 2013

(54) PROCESSING AN INPUT/OUTPUT REQUEST ON A MULTIPROCESSOR SYSTEM

(75) Inventors: Kishore Kumar Muppirala, Karnataka (IN); Bhanu Gollapudi Venkata Prakash, Karnataka (IN); Narayanan Ananthakrishnan Nellayi, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 541 days.

(21) Appl. No.: 12/000,142

(22) Filed: Dec. 10, 2007

(65) Prior Publication Data

US 2008/0155137 A1 Jun. 26, 2008

(30) Foreign Application Priority Data

Dec. 22, 2006 (IN) .......................... 2388/CHE/2006

(51) Int. Cl.
*G06F 3/00* (2006.01)
*G06F 13/24* (2006.01)
(52) U.S. Cl. .............. 710/5; 710/50; 710/263; 710/269; 718/102
(58) Field of Classification Search .................. None
See application file for complete search history.

(56) References Cited

U.S. PATENT DOCUMENTS

| 5,515,538 | A * | 5/1996 | Kleiman ........................ 710/260 |
| 5,606,559 | A * | 2/1997 | Badger et al. .............. 370/395.7 |
| 5,983,310 | A * | 11/1999 | Adams ................................ 711/6 |
| 6,625,679 | B1 * | 9/2003 | Morrison et al. ............. 710/260 |
| 6,658,522 | B1 * | 12/2003 | Martin et al. ...................... 711/1 |
| 6,732,138 | B1 * | 5/2004 | Browning et al. ............ 718/102 |
| 6,738,847 | B1 * | 5/2004 | Beale et al. ..................... 710/260 |
| 7,222,348 | B1 * | 5/2007 | Athreya et al. ................ 719/321 |
| 7,805,706 | B1 * | 9/2010 | Ly et al. ......................... 717/121 |
| 7,870,553 | B2 * | 1/2011 | Kissell ........................... 718/102 |
| 2001/0037426 | A1 * | 11/2001 | Pawlowski et al. ........... 710/260 |
| 2002/0004966 | A1 * | 1/2002 | Wakat et al. .............. 15/257.06 |
| 2002/0161957 | A1 * | 10/2002 | Comeau et al. ............... 710/260 |
| 2003/0018691 | A1 * | 1/2003 | Bono ............................. 709/106 |
| 2003/0187914 | A1 * | 10/2003 | Kaniyar et al. ............... 709/201 |
| 2004/0139305 | A1 * | 7/2004 | Arimilli et al. ............... 712/227 |
| 2004/0153601 | A1 * | 8/2004 | Blankenagel ................. 711/103 |
| 2004/0221127 | A1 * | 11/2004 | Ang .............................. 711/203 |
| 2006/0117325 | A1 * | 6/2006 | Wieland et al. ............... 719/321 |

OTHER PUBLICATIONS

"Message Signalled Interrupts, PCI Local Bus Specification 3.0, Section 6.8", (Feb. 3, 2004),pp. 231-253.
"Distributed Interrupts and I/O Forwarding", (2004-2005) 2 pgs. http://web.archive.org/web/20040601-20051229re_/http://docs.hp.com/en/5965-4406/ch05s11.html.

* cited by examiner

*Primary Examiner* — Henry W. H. Tsai
*Assistant Examiner* — Michael Sun

(57) ABSTRACT

A method and system for processing an input/output request on a multiprocessor computer system comprises pinning a process down to a processor issuing the input/output request. An identity of the processor is passed to a device driver which selects a device adapter request queue whose interrupt is bound to the identified processor and issues the request on that queue. The device accepts the request from the device adapter, processes the request and raises a completion interrupt to the identified processor. On completion of the input/output request the process is un-pinned from the processor. In an embodiment the device driver associates a vector of the identified processor with the request and the device, on completion of the request, interrupts the processor indicated by the vector.

15 Claims, 4 Drawing Sheets

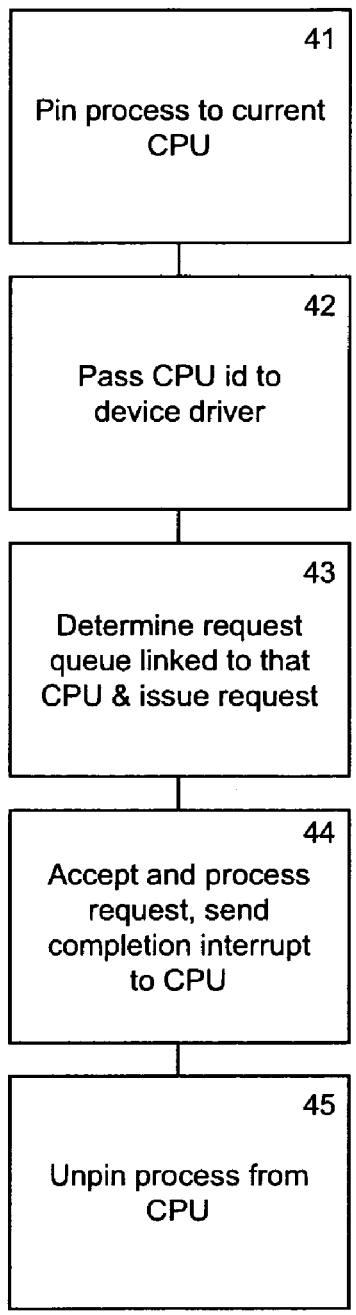
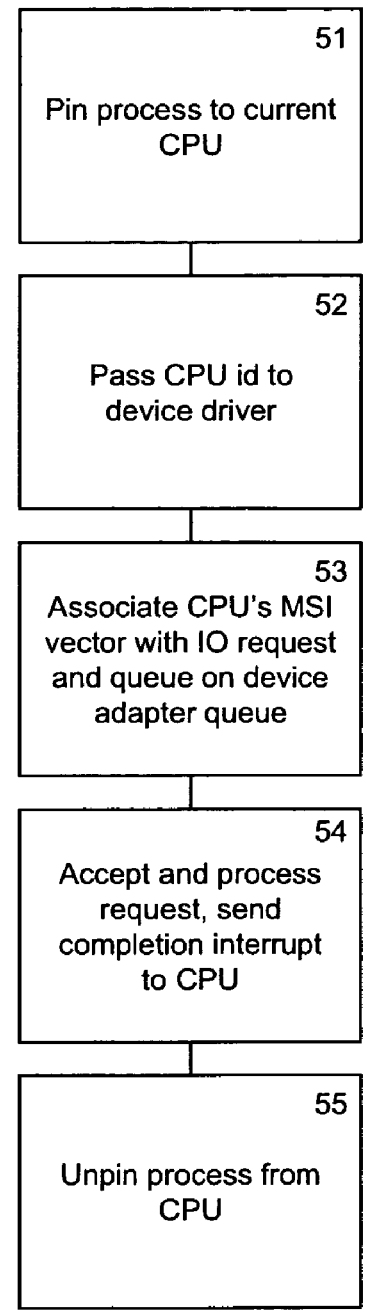
Figure 4
Figure 5

PROCESSING AN INPUT/OUTPUT REQUEST ON A MULTIPROCESSOR SYSTEM

This application claims priority from Indian patent application 2388/CHE/2006, filed on Dec. 22, 2006. The entire content of the aforementioned application is incorporated herein by reference.

BACKGROUND OF THE INVENTION

Faster storage input/output (IO) processing on computer systems can improve performance of most applications—especially those that are database and transaction oriented. In modern computer systems, storage IO turn-around time from an application perspective is made up of two main components:

1. Device IO time—the time taken by the device to access data in the computer's memory by direct memory access (DMA) for a read/write request.
2. Operating system (OS) processing time—the time taken by various OS layers from the moment the request is received by the OS, until request completion is notified to a user process.

The device IO time depends on the IO hardware and memory system design of the computer system. The OS can help improve the device IO time by issuing IO instructions in a particular order so that a device can perform the requested operation with as little latency as possible, for example by sorting IO requests by device address order to reduce device seek times.

The OS processing time usually depends on how many OS internal kernel layers the request passes through—these kernel layers are alternatively referred to as "IO stack" herein. For example, referring to FIG. 1, for a typical OS, an IO request to a disk or other storage device may need to flow through File System 131, Volume Manager 132, Device Driver 133 and Device Interfacing Adapter Driver 134 layers to reach a target device. As a request passes through these IO stack layers, each layer maintains bookkeeping data structures for tracking the request. This bookkeeping data of the IO stack is referred to as metadata. Once the request is serviced by the device, these layers perform completion processing and clean-up, or update, the state of the request in their metadata, before notifying the requesting process of the completion of the request.

Usually, while processing the IO request, the kernel layers 13 focus on processing the metadata maintained by each layer for tracking the request.

Referring again to FIG. 1, and considering request and completion processing on a multiprocessor computer system 10 as illustrated, when a process 11 makes an IO request on a first processor 12, the kernel layers 13 process the request on that first processor 12 and issue a request to a device adapter 14 from that first processor itself. The device adapter, however, may be configured to interrupt a second processor 15 rather than the first processor 12 on completing the IO, resulting in the IO stack layers accessing their metadata on a different processor 15 while processing the IO completion. As the request issue path was executed on the first processor 12, the second processor 15 generates a considerable amount of cache coherency traffic on a central bus 16, linking the first and second processors, to bring in metadata from a cache of the first processor 12 to a cache of the second processor 15. This not only results in more CPU cycles being used for the IO completion processing, but also affects the overall system performance by creating additional traffic on the central bus 16.

To avoid this additional cache coherency traffic, a process may be bound to a processor to which a device's interrupt is bound. However, this can create significant load imbalance on a system by binding many processes to a processor to which an IO card's interrupts are bound. Further, a process may need to be migrated to another CPU when it started performing IO to a device whose interrupts are bound to that other CPU, resulting in additional overheads associated with process movement between CPUs.

Although a memory is shown on the central bus in FIGS. 1 to 3, the location of memory, whether, for example, it is on central bus or split between CPUs, is immaterial for the current discussion.

Referring to FIG. 2, an existing practice, known from, for example, "Release Notes for HP-UX 10.30: HP 9000 Computers" HP Part Number: 5965-4406, Fifth Edition (E0697), June 1997, Chapter 5, Hewlett-Packard Company, 3000 Hanover Street, Palo Alto, Calif. 94304 U.S.A. is to perform IO forwarding. In this approach, in a computer system 20, IO requests 211 initiated on a first processor 22 which are directed to a device 243 are forwarded to a second processor 25, which is configured to be interrupted by the device 243 when the IO completes. IO forwarding is usually deployed at the device driver level 253 in the IO stack, as the device adapter 24 through which the IO request would be issued is likely to be known at this IO stack layer. This technique ensures that the device driver 253 and interface driver 254 components of the IO stack are executed on the same processor 25. Thus, the metadata of these IO stack layers is always accessed on one processor 25—the CPU to which the device adapter interrupt is bound. Thus, FIG. 2 shows an IO request 211 originating on a first processor 22, which is forwarded to a second processor 25, the CPU to which the device interrupts are bound, where it is processed.

BRIEF DESCRIPTION OF THE DRAWINGS

Embodiments of the present invention will now be described, by way of example only, with reference to the accompanying drawings, in which:

FIG. 4 is a flowchart of a method of request processing on a multiprocessor system according to an embodiment of the invention; and FIG. 5 is a flowchart of a method of request processing on a multiprocessor system according to another embodiment of the invention.

DETAILED DESCRIPTION OF EMBODIMENTS

Figure 1:
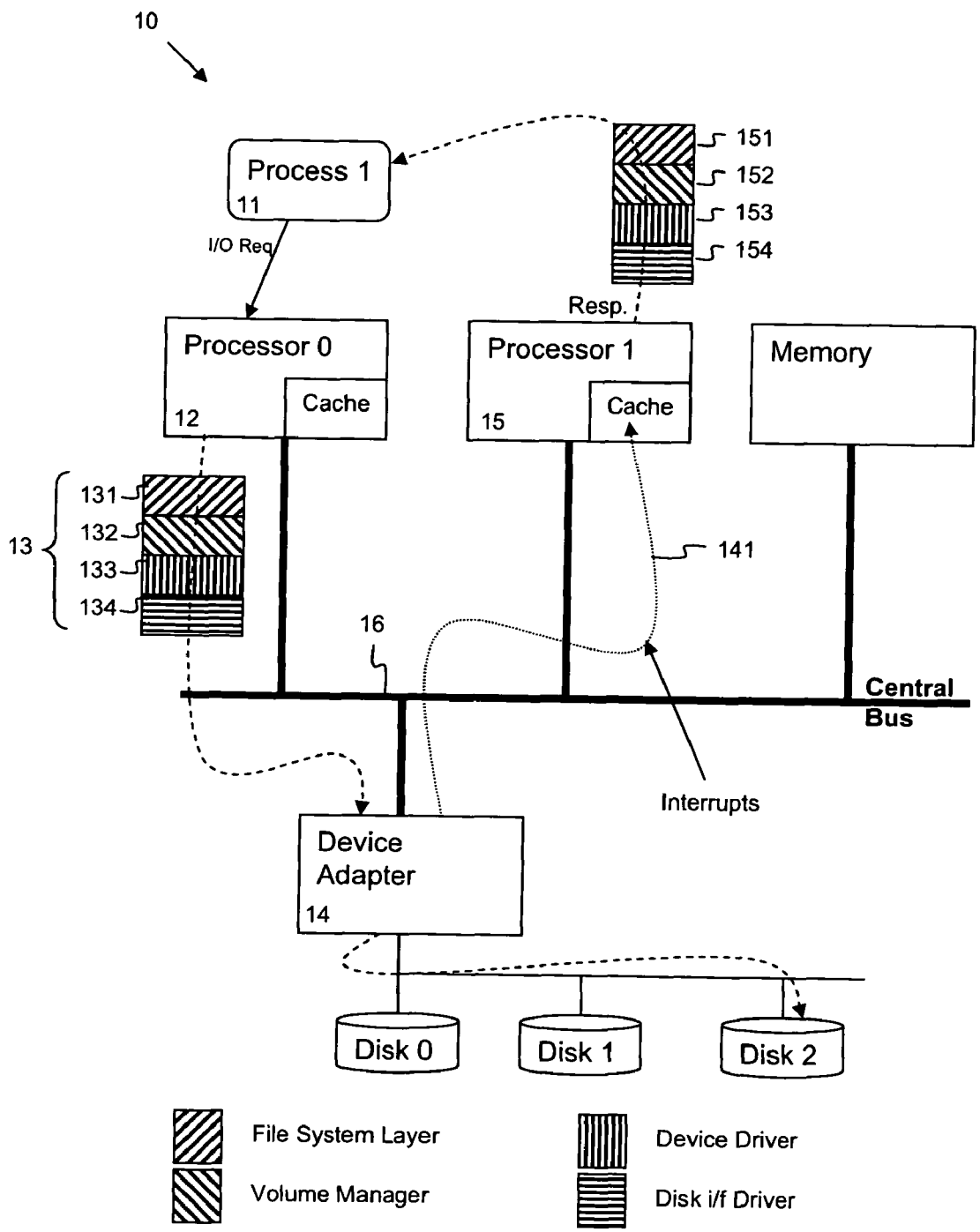
FIG. 1 is a schematic drawing of a known method of request processing on a multiprocessor system.
Figure 2:
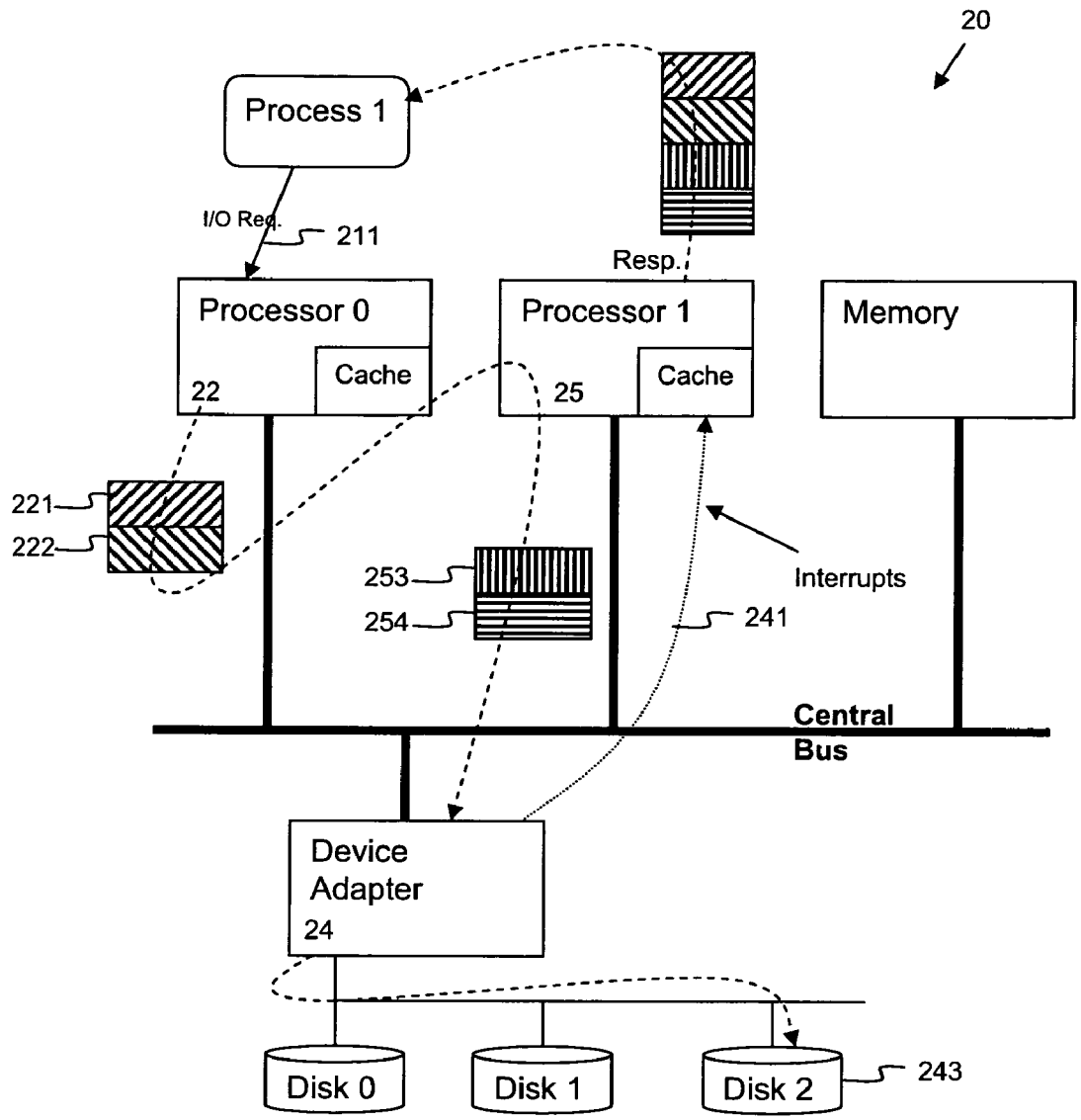
FIG. 2 is a schematic drawing of another known method of request processing using process forwarding on a multiprocessor system.

Throughout the description, identical reference numerals are used to identify like parts and throughout this document the terms "processor" and "CPU" are used interchangeably.

Multi-interrupt capable device adapters handle requests from multiple queues and deliver request completion interrupts to multiple CPUs. Message Signaled Interrupts (MSI), a technology defined in the PCI 2.2 and later standards and the PCI Express standard is one such technology that allows a device adapter to have an interrupt transaction associated with each of its request queues. Such a device can deliver interrupts to any processor in an SMP platform. By supporting separate and independent Message Address/Data for each MSI vector, the device can target interrupts to different processors in an SMP platform without relying on a re-vectoring table in the chip set.

Thus, a multi-interrupt capable device can direct interrupts to as many CPUs as the number of queues the device can support.

As noted above, an IO forwarding approach works effectively if the device adapter 24 always interrupts a particular CPU. However, IO forwarding cannot exploit multi-CPU interrupting capability of a multi-interrupt capable device. A method is described herein to exploit capabilities of a device adapter to facilitate better cache locality exploitation of IO stack metadata. The techniques are also applicable to IO technologies and cards that are capable of associating an interrupt transaction, i.e. an indication of which CPU to interrupt on request completion, for each individual request, as opposed to each request queue.

Figure 3:
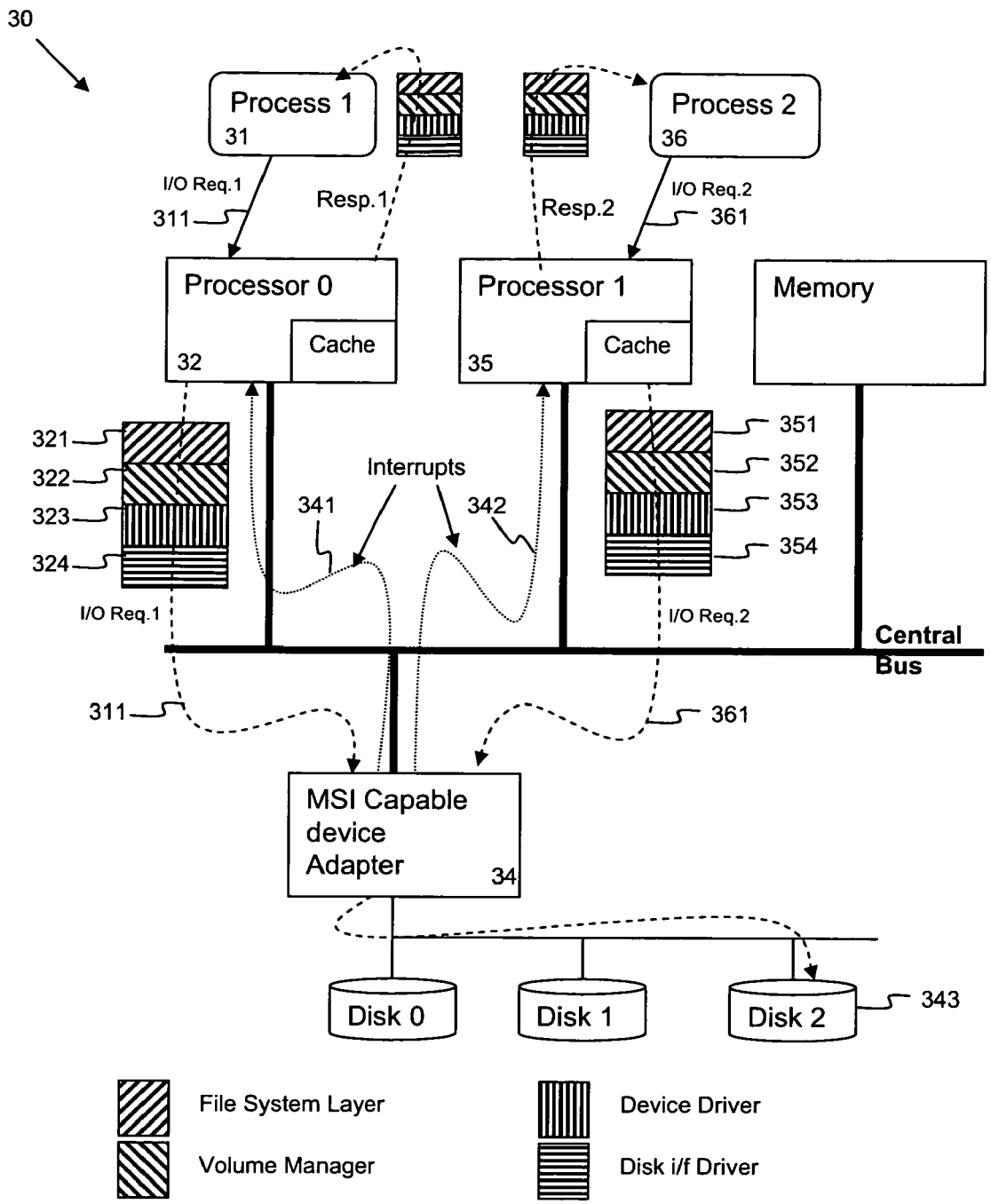
FIG. 3 is a schematic drawing of request processing on a multiprocessor system according to an embodiment of the invention.

Referring to FIG. 3, a device adapter 34 is capable of interrupting all the CPUs 32, in a computer system 30, by having as many queues as the number of processors. Further, the OS scheduling policies of the processors have a mechanism to pin-down a process to a processor either on a temporary basis—called soft affinity—or for a life of the process—called hard affinity. A difference between hard and soft affinities is that if a process has "hard affinity" to a processor, the process is guaranteed to execute on that processor only for its lifetime. If a process has soft affinity, it means until a particular event happens, (like completion of IO, or a specified quantum of time, the process will be scheduled to run on a given processor. After that event, the process is free to be scheduled on any processor.

The soft affinity feature of pinning-down the process to its current CPU 32 is utilized in the computer system 30 as soon as a request 311 enters OS (kernel) layers 321-324. The first processor 32 to which the process 311 is pinned is registered in the kernel's metadata associated with the request and passed down to the device driver layer 323 of the kernel. The device driver 323 utilizes this information to place the request into a device adapter 34 request queue having an associated interruptible processor 32 which is the same as the processor 32 to which the process 31 is pinned. This ensures that all kernel layers 321-324 will execute both the IO request issue code path and the request completion code paths on the same first processor 32, significantly improving chances of exploiting cache locality of the metadata associated with the IO request. The process is un-pinned, or released, from soft affinity as soon as the IO request processing is completed by the OS.

When the IO request is complete the process may therefore, if needed, be migrated by the OS to be executed on a second CPU. When the process migrates to the second CPU—say second processor 35 and makes an IO request 361 to the same device 343, this technique similarly pins the process to the second processor 35 until the IO request 361 is complete. In this case, the device driver 353 of the second processor 35 issues the IO request 361 to a different queue of the multi-interrupt capable device adapter 34 so that the completion interrupt 342 is delivered to the second processor 35—as the process is pinned to that CPU through soft affinity. FIG. 3 shows the kernel layers 321-324, 351-354 executing both the IO request issue code path 311, 361 and IO request completion code paths 341, 342 on a same respective CPU. This "per-request" pinning of a requesting process to a processor improves the chances of exploiting the cache locality of metadata associated with the IO request because in the case of an IO stack, unlike for instance a networking stack, there is a guaranteed response for every out-bound request. Unsolicited traffic in such i/o stacks is significantly small (typically <1%, owing to errors for instance). Thus, the i/o stack has a high-degree of locality compared, for instance, to a networking stack. Moreover, the multiple layers of the stack can all benefit from the cache-locality.

As shown in FIG. 3, in the case of the first request the IO request 311, the "IO issue" path, flows from process 31, down through the IO stack to reach the device driver 323. On the "IO completion" path 341, they show that the device interrupts the CPU 32 first, which then initiates a reverse traversal through the IO stack before the IO completion is intimated to the process 31. Thus in FIG. 3, a same IO stack (code) runs on all processors. It is just that on an IO request on the first processor 32, the forward code path is executed on that first processor. When the completion interrupt is delivered to the second processor 35 by the device, the completion (reverse) code path is executed on the second processor.

Referring to FIG. 4, steps associated with the IO request processing are:
1. On entry into the kernel, temporarily pin 41 the process down to its current CPU using the soft affinity facilities provided by the OS.
2. Pass 42 the CPU-id of the current CPU to the device driver.
3. The device driver determines 43 the device adapter request queue whose interrupt is bound to the identified CPU and issues the request on that queue.
4. The device accepts the request, processes it and raises 44 the completion interrupt to the identified CPU.
5. The IO completion processing code completes and "unpins" 45 the process from the current CPU, i.e. removes the soft affinity.

The realization of this approach can be simplified if a device adapter is capable of associating an interrupt vector with each request, as an overhead of identifying a particular queue to place the request is avoided. From an adapter perspective, the reduced number of queues may also help to simplify hardware implementation of the adapter. With such adapters, each IO request can be scheduled to be completed on a CPU from which the request originated, eliminating the "cache coherency traffic" for IO stack metadata.

Referring to FIG. 5, for a device capable of associating an interrupt vector with a request, steps for each request in its queue(s) are:
1. On entry into the kernel, pin 51 the process down to its current CPU using soft affinity.
2. Pass 52 the CPU-id of the current CPU down to the device driver.
3. Device driver associates this CPU's MSI vector with the IO request and queues 53 it on the device adapter's request queue (or one of the request queues, if the device adapter supports multiple request queues). An MSI Vector in this context is an address floated by the IO adapter to direct an interrupt transaction to a processor.
4. The device adapter accepts the requests, processes it and raises 54 the completion interrupt to the CPU identified by the vector.
5. The IO completion processing code completes and "unpins" 55 the process from the current CPU, i.e. removes the soft affinity.

Although reference has been made to using an MSI vector, it will be understood that the processor can be identified with some other vector capable of identifying the processor to which the process is pinned.

With multi-interrupt capable device adapters, each of the device adapter queues could be mapped with a set of enddevices and the requests queued accordingly. However, this may not help the metadata locality for each layer of the IO stack, as is possible with the described method, especially when the number of queues supported by the device adapter either matches or exceeds the number of CPUs.

Generally the OS will have a policy for assigning interrupts to device adapters, a typical policy being round-robin. However, there are scenarios where the round-robin interrupt allocation policy leads to some CPUs becoming IO bound as the device adapters bound to those CPUs are more heavily loaded than others. To overcome such overload, the OS may provide a mechanism whereby a user can override the round-robin policy and customize the interrupt allocation policy to balance the IO load across the adapters. With the described method, the interrupt allocation policy can be simple, as every multi-interrupt capable adapter can have a queue corresponding to every CPU in the system. Even if a particular adapter is overloaded, it will due to multiple processes running on different CPUs and so no single CPU is overloaded. Thus, all the CPUs are likely to take an equal interrupt processing load. The worst case scenario is that all the IO requests are to a particular adapter from the same process. Unless and until the process has a hard-affinity to a CPU, it will be scheduled to run on different CPUs during its lifetime. The described method ensures that the IO issue and completion path occur on a same CPU, so that the IO processing load will be likely to be equally shared by all CPUs in a system.

In the case of an IO stack, there is a guaranteed response for every out-bound request. Unsolicited traffic in these stacks is significantly small (typically <1%, owing to errors etc.). Thus, the stack has a high-degree of locality compared to the networking counterparts. Also, the multiple layers of the stack can all benefit from the cache-locality.

The described method can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although embodiments of the present invention have been described, workers skilled in the art will recognize that changes may be made in form and detail without departing from the spirit and scope of the invention.

We claim:

1. A multiprocessor system comprising:
a plurality of processors;
a device driver;
a device adapter, wherein the device driver and the device adapter are associated with layers of an operating system kernel;
scheduling means to pin down a process to a processor of the plurality of processors until an input/output request generated by the process is completed;
a registering-processor-in-metadata-component for registering the processor in metadata of the operating system kernel, wherein the metadata is associated with the request;
one or more operating system kernel layers for executing an input/output request issue code path and an input/output request completion code path on the processor; and means for identifying the processor to the device driver so that the input/output request is placed by the device driver in a request queue of the device adapter such that on completion of the request the processor to which the process is pinned down receives a completion interrupt.

2. The multiprocessor system as claimed in claim 1, wherein the scheduling means pins down the process as soon as a request enters OS kernel layers of the processor.

3. The multiprocessor system as claimed in claim 1, wherein the device adapter has a plurality of request queues bound to interrupt respective processors of the plurality of processors.

4. The multiprocessor system as claimed in claim 1, wherein the device adapter has as many queues as there are processors in the multiprocessor system so that the device adapter can interrupt any of the processors.

5. The multiprocessor system as claimed in claim 1, wherein the device driver receives an identity of the processor to which the process is pinned and determines a device adapter request queue whose interrupt is bound to the identified processor and issues the input/output request on that queue.

6. The multiprocessor system as claimed in claim 1, wherein the device driver associates a vector of the identified processor with the request and queues the request with the vector on the request queue and a device accepting the request from the request queue issues, on completion of the request, a completion interrupt to the processor identified by the vector.

7. The multiprocessor system as claimed in claim 6, wherein the vector is a Message Signaled Interrupt vector.

8. A computer system comprising:
a plurality of processors;
means for pinning a process down to a processor of the plurality of processors issuing an input/output request;
means for passing an identity of the processor to a device driver arranged to one of:
determine a device adapter request queue whose interrupt is bound to the identity of the processor and to issue the request on that queue; and
associate a vector of the identity of the processor with the request and to queue the request on a queue of a device adapter, wherein the device driver and the device adapter are associated with layers of an operating system kernel;
a device arranged to accept the queued request from the device adapter, to process the request and to send a completion interrupt to the identity of the processor;
a registering-processor-in-metadata-component for registering the processor in metadata of the operating system kernel, wherein the metadata is associated with the request;
one or more operating system kernel layers for executing an input/output request issue code path and an input/output request completion code path on the processor; and
means, on completion of the input/output request, for unpinning the process from the processor.

9. A method of processing an input/output request on a multiprocessor system comprising:
pinning a process down to a processor issuing the input/output request;
passing an identity of the processor to a device driver;
the device driver one of:
determining a device adapter request queue whose interrupt is bound to the identity of the processor and issuing the request on that queue; and associating a vector of the identity of the processor with the request and queuing the request on a queue of a device adapter, wherein the device driver and the device adapter are associated with layers of an operating system kernel;

registering the processor in metadata of the operating system kernel, wherein the metadata is associated with the request;

executing an input/output request issue code path and an input/output request completion code path by the operating system kernel layers on the processor;

the device accepting the request from the device adapter, processing the request and raising a completion interrupt to the identity of the processor; and on completion of the input/output request un-pinning the process from the processor.

10. The method as claimed in claim 9, wherein the process is pinned to the processor upon the input/output request entering kernel layers of the processor.

11. The method as claimed in claim 9, wherein pinning a process down to a processor until completion of the process comprises using soft affinity.

12. The method as claimed in claim 9, wherein identity of the processor to which the process is bound is registered in metadata of a kernel associated with the request and passed down to a device driver layer of the kernel.

13. The method as claimed in claim 9, wherein unpinning the process comprises removing soft affinity.

14. The method as claimed in claim 9, comprising:
the device driver associating an Message Signaled Interrupt (MSI) vector of the identity of the processor with the request and queuing the request on a queue of a device adapter; and the device accepting the request from the device adapter, processing the request and raising a completion interrupt to the identity of the processor using the associated vector.

15. A non-transitory computer readable medium having stored thereon computer executable software code for processing an input/output request on a multiprocessor system, the computer executable software code comprising:

pinning a process down to a processor issuing the input/output request;

passing an identity of the processor to a device driver;

the device driver one of:
determining a device adapter request queue whose interrupt is bound to the identity of the processor and issuing the request on that queue; and associating a vector of the identity of the processor with the request and queuing the request on a queue of a device adapter, wherein the device driver and the device adapter are associated with layers of an operating system kernel;

registering the processor in metadata of the operating system kernel, wherein the metadata is associated with the request;

executing an input/output request issue code path and an input/output request completion code path by the operating system kernel layers on the processor;

the device accepting the request from the device adapter, processing the request and raising a completion interrupt to the identity of the processor; and on completion of the input/output request un-pinning the process from the processor.

* * * * *